United States Patent
Effing

(10) Patent No.: US 11,018,417 B2
(45) Date of Patent: May 25, 2021

(54) SHORT CIRCUIT DETECTION APPARATUS FOR RESONANT ANTENNA NETWORKS AND METHODS THEREFOR

(71) Applicant: NXP B.V., Eindhoven (NL)

(72) Inventor: Hermanus Johannes Effing, Overasselt (NL)

(73) Assignee: NXP B.V., Eindhoven (NL)

(*) Notice: Subject to any disclaimer, the term of this patent is extended or adjusted under 35 U.S.C. 154(b) by 97 days.

(21) Appl. No.: 16/396,156

(22) Filed: Apr. 26, 2019

(65) Prior Publication Data

US 2020/0343625 A1 Oct. 29, 2020

(51) Int. Cl.
*H01Q 1/32* (2006.01)
*H01Q 5/10* (2015.01)

(52) U.S. Cl.
CPC ............. *H01Q 1/3208* (2013.01); *H01Q 5/10* (2015.01)

(58) Field of Classification Search
CPC ...... H04B 1/18; H04B 1/0466; H04B 1/3822; H01Q 3/01; H01Q 5/10; H01Q 1/3208; H01Q 15/002; H01Q 23/00; G01R 31/52; B60R 25/248
See application file for complete search history.

(56) References Cited

U.S. PATENT DOCUMENTS

| | | | |
|---|---|---|---|
| 6,928,281 B2* | 8/2005 | Ward | H01Q 23/00 455/13.3 |
| 7,863,833 B2* | 1/2011 | Tamegai | H02M 3/33507 315/307 |
| 9,461,714 B2* | 10/2016 | Cook | H02J 7/0044 |
| 10,000,187 B2* | 6/2018 | Hamada | B60R 25/245 |
| 10,389,022 B2* | 8/2019 | Zhu | H04N 21/4383 |
| 10,439,659 B1* | 10/2019 | Fleischhacker | H04B 1/745 |
| 10,516,372 B1* | 12/2019 | Effing | G01R 15/146 |
| 10,654,447 B2* | 5/2020 | Oesterling | H04W 12/04 |
| 2015/0004917 A1* | 1/2015 | Juzswik | H04B 17/21 455/67.13 |
| 2017/0373390 A1 | 12/2017 | Zhu | |
| 2020/0217947 A1* | 7/2020 | Stitt | B60R 25/209 |

FOREIGN PATENT DOCUMENTS

CN 102064517 A 5/2011
WO 2018104929 A1 6/2018

OTHER PUBLICATIONS

U.S. Appl. No. 16/026,180, filed Jul. 3, 2018, entitled "Low Cost LF Driver Current Sense Topology".

* cited by examiner

*Primary Examiner* — Haissa Philogene

(57) ABSTRACT

A vehicle communication system includes a vehicle access module, a plurality of cables coupled to the vehicle access module, and an antenna coupled to the plurality of cables, wherein based upon short circuit analysis of the plurality of cables by the vehicle access module, the plurality of cables are decoupled from the vehicle access module. In order to determine with a short circuit exists in the plurality of cables, the short circuit analysis includes a determination as to whether a maximum of antenna current samples taken from the antenna is greater than a diagnostic parameter times an average of the antenna current samples.

18 Claims, 3 Drawing Sheets

SHORT CIRCUIT DETECTION APPARATUS FOR RESONANT ANTENNA NETWORKS AND METHODS THEREFOR

BACKGROUND

Vehicle communication systems typically utilize low-frequency (LF)-based access systems to communicate with wireless devices associated with the vehicle. The vehicle communication systems are generally used for communication between passive keyless automotive entry systems and other wireless communication devices that are a part of the vehicle communication system. Due to the presence of metal components and cabling within the vehicle, vehicle communication systems are often subject to short circuits that can damage processing components within the vehicle communication system, especially when appropriate corrective action is not taken to remedy the short circuits. Thus, there exists a need to provide vehicle communication systems that are able to prevent short circuits from damaging the vehicle communication systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
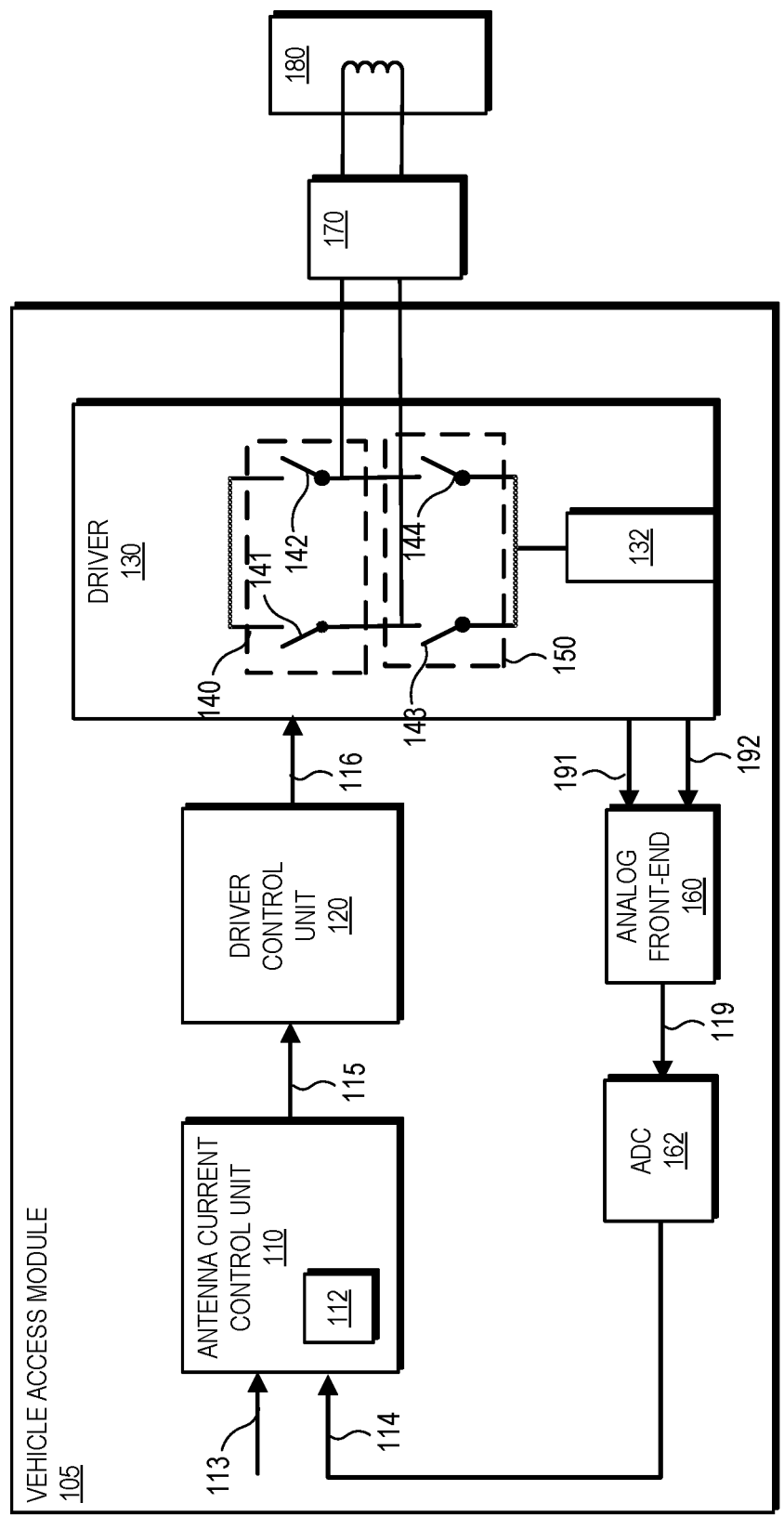
FIG. 1 is a block diagram of a vehicle communication system in accordance with some embodiments.
Figure 2:
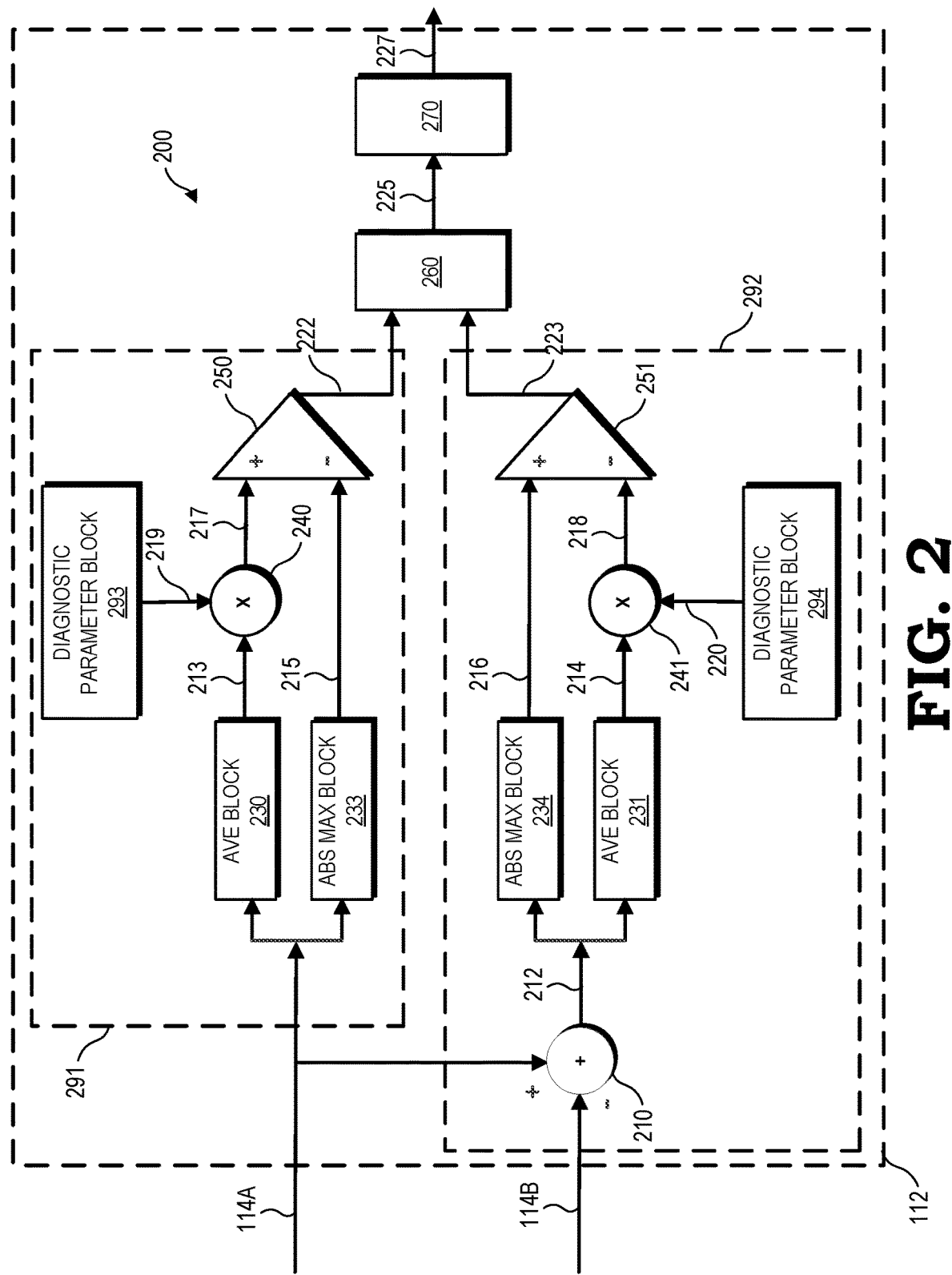
FIG. 2 is a circuit of a diagnostic monitor of the vehicle communication system of FIG. 1 in accordance with some embodiments.
Figure 3:
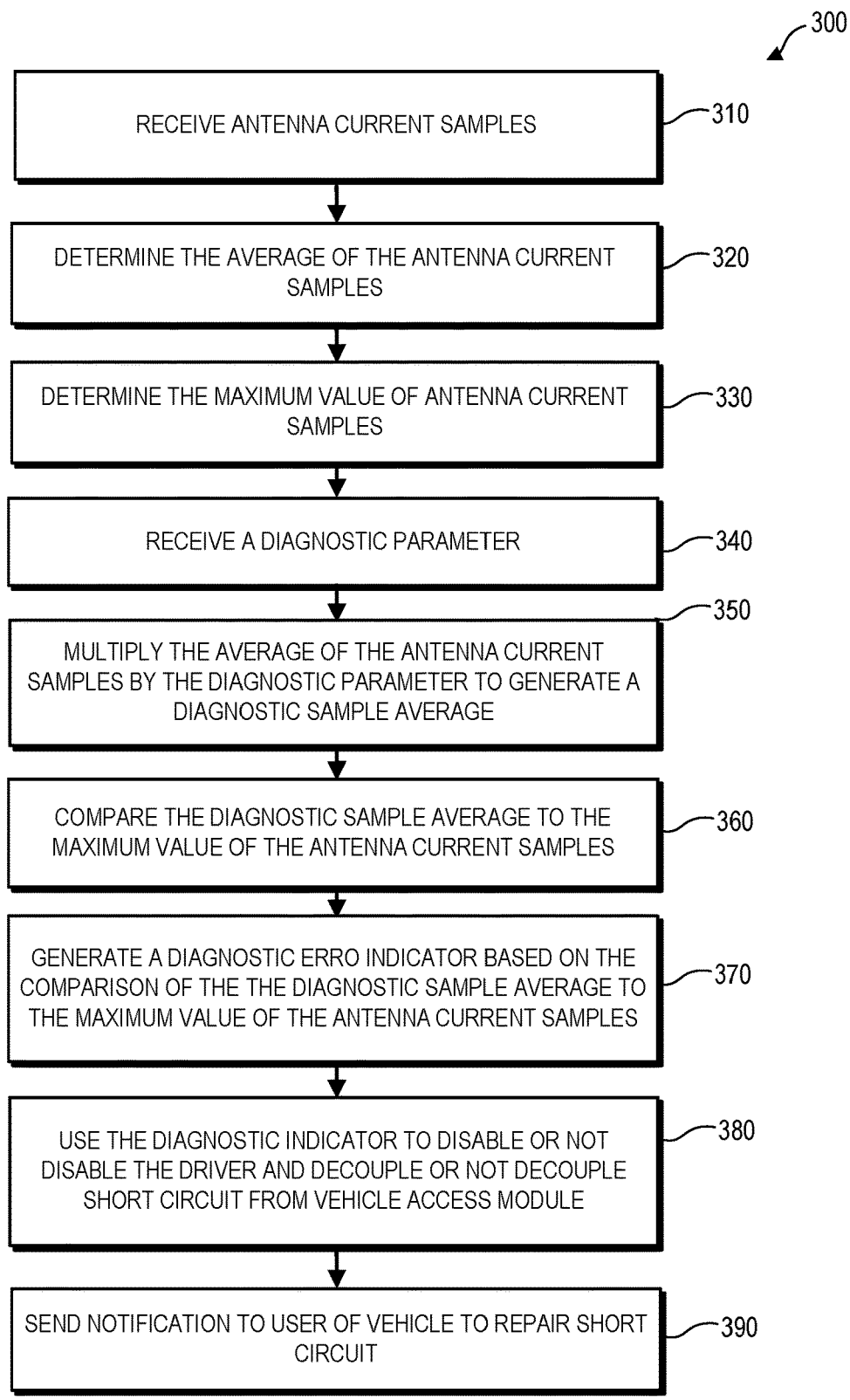
FIG. 3 illustrates a flow diagram of a method of performing a short circuit analysis of the vehicle communication system of FIG. 1 in accordance with some embodiments.

FIGS. 1-3 illustrate systems and techniques for detecting a short circuit in a vehicle communication system, allowing a user of the vehicle to be notified that a short circuit exists and needs to be rectified. In order to facilitate the detection of a short circuit in the vehicle communication system, a vehicle access module is configured to use a diagnostic monitor to continuously analyze samples of the antenna current flowing from the antenna to ensure that the antenna current is within a diagnostic threshold associated with sinusoidal waves. That is, when the vehicle access module determines that the antenna current does not resemble a sinusoidal wave, the module determines that a short circuit exists in the vehicle communication system and the cables having the short circuit are decoupled from the vehicle access module of the vehicle communication system. The operator of the vehicle is then notified of the short circuit and advised that corrective action should be taken to rectify the short circuit, thereby preventing damage to the vehicle communication system.

FIG. 1 illustrates a vehicle communication system 100 according to some embodiments. Vehicle communication system 100 includes a vehicle access module 105, cables 170, and an antenna 180. The vehicle access module 105 includes an antenna current control unit 110, a driver control unit 120, a driver circuit 130, an analog front-end 160, and an analog-to-digital converter (ADC) 162. In various embodiments, antenna current control unit 110 is coupled to driver control unit 120 and ADC 162. Driver control unit 120 is coupled to antenna current control unit 110 and driver circuit 130. Driver circuit 130 is coupled to driver control unit 120, analog front-end 160, and cables 170. Cables 170 includes a plurality of cables that are coupled to antenna 180 and the driver circuit 130 of vehicle access module 105. In various embodiments, driver circuit 130 is an antenna driver, which may be considered a low frequency power stage that is connected to an adaption of an LC network. In various embodiments, driver circuit 130 may be, for example, a Class-D Driver that uses, for example, a full-bridge (H-bridge) or a half-bridge topology. A specific example of driver circuit 130, may be, for example, a basic four-switch Class-D driver (or amplifier) design with output amplitude-control clamp circuitry in the form of regulators and diodes. In such driver circuit designs, the four switches, switch 141, switch 142, switch 143, and switch 144, are implemented as field-effect transistors (FETs) driven in common mode, with opposing-phase signals driving a pair of high-side FETs and a pair of low-side FETs. For some specific LF vehicle communication systems 100, passive keyless automotive entry systems are used for vehicle communication within the vehicle communication system 100.

During operation of vehicle communication system 100, diagnostic monitor 112 of antenna current control unit 110 receives antenna current samples 114 from ADC 162. Antenna current samples 114 are digital samples of an analog antenna current originating from, for example, antenna 180 that are converted to digital form by ADC 162. ADC 162 is an analog-to-digital converter that is used to convert analog current signals 119 to digital antenna current samples 114 as is well known in the art. Diagnostic monitor 112 receives the antenna current samples 114 and uses the antenna current samples 114 to conduct a short circuit analysis of the vehicle communication system 100 in order to determine whether a short circuit exists in, for example, the cables 170 of vehicle communication system 100. Detection of a short circuit in cables 170 prevents cables 170 from providing a surge in current to vehicle access module 105 that could damage the processing components of vehicle access module 105. Diagnostic monitor 112 analyzes antenna current samples 114 to determine whether the shape of the digitized antenna current (antenna current samples 114) deviates from the expected sinusoidal shape of the antenna current within an acceptable diagnostic threshold. The determination of the amount of deviation of the antenna current samples 114 from the expected sinusoidal shape of the antenna current samples 114 is an indication of whether a short circuit exists in cables 170, as described further below with respect to FIG. 2.

After diagnostic monitor 112 of antenna current control unit 110 performs the short circuit analysis, diagnostic monitor 112 provides a diagnostic error indicator 115 to driver control unit 120 that indicates whether the vehicle communication system 100 has a short circuit. That is, when diagnostic monitor determines that a short circuit exists in vehicle communication system 100, diagnostic monitor 112 provides diagnostic error indicator 115 indicative of there being a short circuit in cables 170 to driver control unit 120. When diagnostic monitor determines that a short circuit does not exist in vehicle communication system 100, diagnostic monitor 112 provides diagnostic error indicator 115 to driver control unit 120 indicative of a short circuit not being in cables 170. Driver control unit 120 uses the diagnostic error indicator 115 to generate a switch configuration signal 116 that is used by driver circuit 130 to either decouple the short circuit from the vehicle access module 105 or allow the cables 170 to remain driven by the driver circuit 130. Switch configuration signal 116 is a signal provided to driver circuit 130 that indicates the switch configuration of switches 140 and switches 150. That is, when the diagnostic error indicator 115 indicates that there is a short circuit in cables 170, switch configuration signal 116 is used by driver circuit 130 to open switch 141, switch 142, switch 143, and switch 144 of driver circuit 130 in order to disable driver circuit 130 and decouple the short circuit existing in cables 170 from the vehicle access module 105. When the diagnostic error indicator 115 indicates that there is not a short circuit in cables 170, switch configuration signal 116 allows the normal ClassD drive sequence control of the switches 141, 142, 143, and 144 in order to drive the cable 170 and associated antenna 180. Thus, using the switch configuration signal 116 that is generated based on diagnostic error indicator 115, the driver circuit 130 may be disabled such that there is no current and the voltage on the antenna lines of antenna 180, and damage to the driver circuit 130 is prevented. When a short circuit is detected by diagnostic monitor 112, a notification may be provided by vehicle access module 105 to the user of the vehicle to perform maintenance on the system to repair the short circuit.

FIG. 2 illustrates a diagnostic monitor 112 utilized by vehicle communication system 100 to detect whether a short circuit exists in cables 170 of FIG. 1 according to various embodiments. Diagnostic monitor 112 includes a diagnostic monitoring block 291, a diagnostic monitoring block 292, an OR block 260, and a filter 270. Diagnostic monitoring block 291 includes an average calculation block 230, an absolute maximum block 233, a multiplier block 240, a diagnostic parameter block 293, and a comparator 250. Diagnostic monitoring block 292 includes an adder block 210, an average calculation block 231, an absolute maximum block 234, a multiplier block 241, a diagnostic parameter block 293, and a comparator 251.

During operation of diagnostic monitor 112, diagnostic monitor 112 receives antenna current samples 114A and antenna current samples 114B from ADC 162 of FIG. 1. The number of samples N of antenna current samples 114A and antenna current samples 114B received by diagnostic monitor 112 is dependent on the sampling cycling period of ADC 162 used by vehicle access module 105 of the vehicle communication system 100. For example, for the vehicle access module 105 depicted in FIG. 1, the ADC 162 is sampling the antenna current with N equal to 32 samples per 125 kilohertz period, although other sampling rates may be used by ADC 162.

Antenna current samples 114 (depicted in FIG. 1) are categorized into distinct sets of antenna current samples, antenna current samples 114A and antenna current samples 114B, representing the samples for N and N−1. The purpose of using antenna current samples 114B for samples N−1 is to be able to use the derivative of the antenna current 114 to determine whether a short circuit exists in cables 170, as described further below. The first set of antenna current samples 114A are provided to average calculation block 230 and absolute maximum block 233 of diagnostic monitoring block 291 to commence the process of monitoring the plurality of cables 170 for short circuits. Average calculation block 230 receives antenna current samples 114A and computes the average of the received antenna current samples 114A and generates antenna sample average output 213. In various embodiments, the average of the received antenna current samples 114A, i.e., antenna sample average output 213, is computed using the following equations:

$$Ant..SampleCorr\,[N] = ADCresult\,[N] \qquad \text{[Eq. 1]}$$

$$Ant..SampleAve = \frac{1}{N} * \sum_{1}^{N} \text{abs}(Ant..SampleCorr\,[N]) \qquad \text{[Eq. 2]}$$

where N is the number of samples, ADCresult is the output of ADC 162 and equivalent to antenna current samples 114A of FIG. 2, and Ant..SampleCorr is equal to ADCresult for the number of samples N.

After computing the average of antenna current samples 114A, i.e., antenna sample average output 213 (which is the output of average calculation block 230), is multiplied by a diagnostic parameter 219 at multiplier block 240 to generate diagnostic antenna sample average 217. The diagnostic parameter 219 is a short circuit parameter indicative of whether the antenna current samples 114 are adequately sinusoidal in shape and allows diagnostic monitor 112 to adjust the diagnostic threshold of the diagnostic comparison to optimize the balance between the antenna current step versus the antenna current behavior at short conditions. In various embodiments, the diagnostic parameter 219 is defined to be $$\frac{\pi}{2},$$

which is the typical expected ratio between the peak and average of a sinusoidal shaped waveform of the antenna current. In various embodiments, the diagnostic parameter 219 may be other values that are indicative of the antenna current representing a sinusoidal wave.

In addition to antenna current samples 114A being provided to average calculation block 230, antenna current samples 114A are provided to absolute maximum block 233. Absolute maximum block 233 receives the antenna current samples 114A and computes the peak value of the antenna current samples 114A, i.e., antenna sample maximum output 215, using the following equation:

$$Ant..SampleMax = \max(\text{abs}(Ant..SampleCorr[1]), \ldots, \text{abs}(Ant..SampleCorr[32])) \qquad \text{[Eq. 3]}$$

where max ( ) is a function that ascertains the maximum value of its input parameters, e.g., abs (Ant..SampleCorr[1]) through abs (Ant..SampleCorr[32]) where, for the embodiments shown, 32 is the number of samples sampled by the ADC 162.

After computing the peak value of the antenna current samples 114A (i.e., antenna sample maximum output 215), diagnostic antenna sample average 217 and antenna sample maximum output 215 are compared at comparator 250. Comparator 250 compares diagnostic antenna sample average 217 and antenna sample maximum output 215 to determine whether antenna sample maximum output 215 is greater than diagnostic antenna sample average 217. When antenna sample maximum output 215 is greater than diagnostic antenna sample average 217, a diagnostic error indicator 222 indicative of a short circuit in vehicle communication system 100 is output by comparator 250. In various embodiments, a value of "1" may be indicative of a short circuit in vehicle communication system 100. In various embodiments, other values, such as, for example, a "0", may be used by diagnostic monitor 112 to be indicative of a short circuit in vehicle communication system 100. When antenna sample maximum output 215 is not greater than diagnostic antenna sample average 217, a diagnostic error indicator 222 indicative of a short circuit not being in vehicle communication system 100 is output by comparator 250. In various embodiments, a value of "0" may be indicative of there not being a short circuit in vehicle communication system 100. In various embodiments, other values, such as, for example, a "1", may be used by diagnostic monitor 112 to be indicative of there not being a short circuit in vehicle communication system 100. The diagnostic error indicator 222 is then provided to OR block 260.

Referring now to diagnostic monitoring block 292, which performs a short circuit analysis similar to diagnostic monitoring block 291, accept that diagnostic monitoring block 292 is generating a diagnostic error indicator 223 based on the derivative of the received antenna current sample 114B, instead of the original antenna current samples 114B. Adder block 210 of diagnostic monitoring block 292 receives antenna current samples 114A and antenna current samples 114B in order to compute the difference between the antenna current samples 114A and antenna current samples 114B, corresponding to ADCresult[N] and ADCresult[N−1], respectively, of Eq. 1. The difference between the antenna current samples 114A and antenna current samples 114B is considered the first derivative of antenna current samples 114A and, similar to antenna current samples 114A which is expected to have a sine shape, is expected to have a cosine shape. Adder block 210 subtracts antenna current samples 114B from antenna current samples 114A to generate antenna current sample step 212, as illustrated in Eq. 4.

$$Ant..SampleStep[N]=ADCresult[N]-ADCresult[N-1] \quad [Eq. 4]$$

where ADCresult[N] refers to the antenna current samples 114A and ADCresult[N−1] refers to the antenna current samples 114B of FIG. 2

Antenna current sample step 212 is then provided to average calculation block 231 and absolute maximum block 234. Average calculation block 231 receives antenna current sample step 212 and computes the average of the received antenna current sample step 212 to generate average an antenna sample step average output 214. In various embodiments, the average of the received antenna current sample step 212, i.e., antenna sample step average output 214, is computed using the following equation:

$$Ant..SampleStepAve = \frac{1}{N-1} * \sum_{2}^{N} \text{abs}(Ant..SampleStep[N]) \quad [Eq. 5]$$

where, similar to equations 1 and 2 above, N is the number of samples, ADCresult is the output of ADC 162 and equivalent to antenna current samples 114A of FIG. 2, and Ant..SampleStep is equal to ADCresult [N] minus ADCresult [N−1].

After computing the average of antenna current sample step 212, i.e., antenna sample step average output 214 (which is the output of average calculation block 230), is multiplied by a diagnostic parameter 220 at multiplier block 240 to generate diagnostic antenna sample average 217. In various embodiments, the diagnostic parameter 220 is equivalent to diagnostic parameter 219 and similarly is a diagnostic parameter that allows diagnostic monitor 112 to adjust the threshold of the diagnostic comparison to optimize the balance between the antenna current step versus the antenna current behavior at short conditions. In various embodiments, the diagnostic parameter 220 is define to be $\frac{\pi}{2}$, which, as stated previously, may be other values but is the typical expected ratio between peak and average of a sinusoidal shaped waveform.

Referring now to absolute maximum block 234, antenna current sample step 212 is provided to absolute maximum block 234. Absolute maximum block 234 receives the antenna current sample step 212 and computes the peak value of the antenna current sample step 212, i.e., antenna sample step maximum output 216, using the following equation:

$$Ant..SampleStepMax=\max(\text{abs}(Ant..SampleStep[2]), \ldots, \text{abs}(Ant..SampleStep[32])) \quad [Eq. 6]$$

where, similar to equation 3, max ( ) is a function that ascertains the maximum value of the input parameters abs(Ant..SampleStep[2]) through abs(Ant..SampleStep[32]) where, for the embodiments shown, 32 is the number of samples sampled by the ADC 162.

After computing the peak value of the antenna current sample step 212, i.e., antenna sample step maximum output 216, diagnostic antenna sample step average 218 and antenna sample step maximum output 216 are compared at comparator 251. Comparator 251 compares diagnostic antenna sample step average 218 and antenna sample step maximum output 216 to determine whether antenna sample step maximum output 216 is greater than diagnostic antenna sample step average 218. When antenna sample step maximum output 216 is greater than diagnostic antenna sample step average 218, a diagnostic error indicator 223 indicative of a short circuit in vehicle communication system 100 is output by comparator 251. In various embodiments, a value of "1" may be indicative of a short circuit in vehicle communication system 100. In various embodiments, other values, such as, for example, a "0", may be used by diagnostic monitor 112 to be indicative of a short circuit in vehicle communication system 100. When antenna sample step maximum output 216 is not greater than diagnostic antenna sample step average 218, a diagnostic error indicator 223 indicative of a short circuit not being in vehicle communication system 100 is output by comparator 251. In various embodiments, a value of "0" may be indicative of there not being a short circuit in vehicle communication system 100. In various embodiments, other values, such as, for example, a "1", may be used by diagnostic monitor 112 to be indicative of there not being a short circuit in vehicle communication system 100. The diagnostic error indicator 223 is then provided to OR block 260.

OR block 260 receives diagnostic error indicator 222 and diagnostic error indicator 223 and determines whether either of the diagnostic error indicators are indicative of a short circuit in cables 170 (e.g., whether either the diagnostic error indicator 222 or diagnostic error indicator 223 have logical values of 1). When either of the diagnostic error indicators (diagnostic error indicator 222 or diagnostic error indicator 223) are indicative of a short circuit in cables 170, OR block 260 outputs a diagnostic error indicator 225 that is indicative of a short circuit being in cables 170. When both of the diagnostic error indicators (diagnostic error indicator 222 and diagnostic error indicator 223) are indicative of a short circuit not being in cables 170, OR block 260 outputs a diagnostic error indicator 225 that is indicative of a short circuit not being in cables 170. Similar to the output of comparator 250 and comparator 251, the diagnostic error indicator 225 output by diagnostic monitor 112 and subsequently filtered by filter 270 to generate filtered diagnostic error indicator 227, may be, for example, either a 0 or a 1, a "1" being indicative of there being a short circuit in vehicle communication system 100 or a "0" being indicative of there not being a short in vehicle communication system 100. Optionally, diagnostic error indicator 225 may be provided to filter 270 for further filtering as is known in the art.

In various embodiments, the decision by diagnostic monitor 112 as to whether there is a short circuit in, for example, cables 170, of vehicle communication system 100 is based on the following pseudocode (referencing equations 1-6 above):

if ((Ant..SampleMax>DiagRatio*Ant..SampleAve)|| (Ant..SampleStepMax>DiagRatio*Ant..SampleStepAve))
  Ant..DiagError=1
else
  Ant..DiagError=0 where ant..DiagError corresponds to diagnostic error indicator 225 of FIG. 2 whose logical value is dependent on diagnostic error indicator 222 and diagnostic error indicator 223. Thus, the diagnostic error indicator 225 output by diagnostic monitor 112 and subsequently filtered by filter 270, may be, for example, either a 0 or a 1, a "1" being indicative of there being a short circuit in vehicle communication system 100 or a "0" being indicative of there not being a short in vehicle communication system 100. Filtered diagnostic error indicator 227 is then provided driver control unit 120 to either disable able or not disable driver circuit 130, as described previously with reference to switches 140 and switches 150 of FIG. 1

FIG. 3 illustrates a method 300 to detect a short circuit in the vehicle communication system 100 of FIG. 1 according to various embodiments. With reference to FIGS. 1 and 2, at block 310, antenna current samples 144A and 114B are received at diagnostic monitor 112 for short circuit analysis.

At block 320, the average of the antenna current samples 114A, and the average of the modified antenna current samples, i.e., antenna current sample step 212, are determined by average calculation block 230 and average calculation block 231.

At block 330, the maximum values of the antenna current samples 114A and antenna current sample step 212 are determined by absolute maximum block 233 and absolute maximum block 234, respectively.

At block 340, the diagnostic parameters (diagnostic parameter 219 and diagnostic parameter 220) are provided to multiplier block 240 and multiplier block 241 from diagnostic parameter block 293 and diagnostic parameter block 294, respectively.

At block 350, the average of the antenna current samples 114A (i.e., antenna sample average output 213) and the average of the antenna current sample step 212 (i.e., antenna sample step average output 214) are multiplied by the diagnostic parameter 219 and the diagnostic parameter 2220 using multiplier block 240 and multiplier block 241, respectively.

At block 360, diagnostic antenna sample average 217 and diagnostic antenna sample step average 218 are compared to antenna sample maximum output 215 and antenna sample step maximum output 216 at comparator 250 and comparator 251 to generate diagnostic error indicator 222 and diagnostic error indicator 223, respectively, indicative of a short circuit in cables 170 of the vehicle communication system 100.

At block 380, diagnostic error indicator 222 and diagnostic error indicator 223 are used to disable or not disable driver circuit 130, by, for example, opening switches 140 and switches 150, and decoupling the short circuit of cables 170 from vehicle access module 105.

At block 390, a notification is sent by vehicle access module 105 to the user of the vehicle to repair the short circuit of cables 170. In various embodiments, vehicle access module 105 is able to check or recheck the cables 170 and/or antenna 180 for an antenna short circuit at regular intervals. At such a recheck, for example, the antenna 180 and the cables 170 may be driven again by the driver circuit 130 and the vehicle communication system 100 continues checking cables 170 or antenna 180 for short circuits using, for example, method 300.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving antenna current samples at a diagnostic monitoring block;
   receiving a diagnostic parameter at the diagnostic monitoring block, the diagnostic parameter being indicative of an adequate shape of the antenna current samples;
   using the diagnostic parameter to generate a diagnostic error indicator; and
   determining whether to disable a driver circuit based on the diagnostic error indicator.

2. The method of claim 1, wherein:
   determining whether to disable the driver circuit based on the diagnostic error indicator includes:
      determining whether a maximum of the antenna current samples is greater than the diagnostic parameter times an average of the antenna current samples.

3. The method of claim 2, wherein:
   when the maximum of the antenna current samples is greater than the diagnostic parameter times the average of the antenna current samples, the driver circuit is disabled; and
   when the maximum of the antenna current samples is not greater than the diagnostic parameter times the average of the antenna current samples, the driver circuit is not disabled.

4. The method of claim 1, wherein:
   determining whether to disable the driver circuit based on the diagnostic error indicator includes:
      generating antenna current sample steps based on the antenna current samples;
      determining whether a maximum of the antenna current sample steps is greater than the diagnostic parameter times an average of the antenna current sample steps.

5. The method of claim 4, wherein:
   when the maximum of the antenna current sample steps is greater than the diagnostic parameter times the average of the antenna current sample steps, the driver circuit is disabled; and
   when the maximum of the antenna current sample steps is not greater than the diagnostic parameter times the average of the antenna current sample steps, the driver circuit is not disabled.

6. The method of claim 1, wherein:
   when the driver circuit is disabled, disabling the driver circuit includes opening a set of switches located in the driver circuit based upon the diagnostic error indicator.

7. The method of claim 6, wherein:
   opening the set of switches based upon the diagnostic error indicator decouples the driver circuit from a vehicle communication system.

8. The method of claim 1, wherein:
   wherein the diagnostic parameter is a ratio indicative of a diagnostic threshold.

9. The method of claim 8, wherein:
   the diagnostic threshold is $\pi/2$.

10. A processor, comprising:
    an antenna current control unit;
    a driver circuit coupled to the antenna current control unit; and
    an antenna coupled to the driver circuit, wherein, based on a short circuit analysis of antenna current samples, the antenna current control unit determines whether to decouple the driver circuit from the antenna current control unit, wherein the short circuit analysis includes a determination as to whether a short circuit exists in a vehicle communication system coupled to the processor.

11. The processor of claim 10, wherein:
    the driver circuit includes a first set of switches and a second set of switches, wherein based on a diagnostic error indicator provided from the antenna current control unit, both the first set of switches and the second set of switches are opened or closed.

12. The processor of claim 10, wherein:
    the determination as to whether the short circuit exists in the vehicle communication system includes a determination whether to disable the driver circuit based on a diagnostic error indicator.

13. The processor of claim 10, wherein:
    the determination as to whether the short circuit exists in the vehicle communication system includes a determination as to whether a maximum of the antenna current samples is greater than a diagnostic parameter times an average of the antenna current samples.

14. The processor of claim 13, wherein:
    when the maximum of the antenna current samples is greater than the diagnostic parameter times the average of the antenna current samples, the driver circuit is disabled; and
    when the maximum of the antenna current samples is not greater than the diagnostic parameter times the average of the antenna current samples, the driver circuit is not disabled.

15. The processor of claim 10, wherein:
    the determination as to whether the short circuit exists in the vehicle communication system includes a generation of antenna current sample steps based on the antenna current samples; and
    a determination of whether a maximum of the antenna current sample steps is greater than a diagnostic parameter times an average of the antenna current sample steps.

16. The processor of claim 15, wherein:
    when the maximum of the antenna current sample steps is greater than the diagnostic parameter times the average of the antenna current sample steps, the driver circuit is disabled; and
    when the maximum of the antenna current sample steps is not greater than the diagnostic parameter times the average of the antenna current sample steps, the driver circuit is not disabled.

17. The processor of claim 14, wherein:
the driver circuit is an H-bridge driver.

18. A vehicle communication system, comprising:
a vehicle access module;
a plurality of cables coupled to the vehicle access module; and
an antenna coupled to the plurality of cables, wherein based upon short circuit analysis of the plurality of cables by the vehicle access module, the plurality of cables are decoupled from the vehicle access module, wherein in order to determine with a short circuit exists in the plurality of cables, the short circuit analysis includes a determination as to whether a maximum of antenna current samples taken from the antenna is greater than a diagnostic parameter times an average of the antenna current samples.

\* \* \* \* \*